United States Patent
Italiano

(10) Patent No.: US 7,293,530 B2
(45) Date of Patent: Nov. 13, 2007

(54) LIGHTWEIGHT, PORTABLE AND EXPANDABLE SMALL ANIMAL ENCLOSURE

(76) Inventor: Barbara Italiano, 2203 Greenstone Rd., Wilmington, DE (US) 19810

(*) Notice: Subject to any disclaimer, the term of this patent is extended or adjusted under 35 U.S.C. 154(b) by 244 days.

(21) Appl. No.: 11/181,474

(22) Filed: Jul. 15, 2005

(65) Prior Publication Data
US 2007/0012258 A1  Jan. 18, 2007

(51) Int. Cl.
*A01K 1/03* (2006.01)

(52) U.S. Cl. .................. 119/498; 119/453; 119/474; 256/25; 256/26

(58) Field of Classification Search ............. 119/452, 119/453, 482, 498, 499, 512, 513, 474; 135/128, 135/157, 137, 117; 256/25, 26, 73; 292/281, 292/282, DIG. 29; 43/100–106
See application file for complete search history.

(56) References Cited

U.S. PATENT DOCUMENTS

| | | | | |
|---|---|---|---|---|
| 667,472 A * | 2/1901 | Welch et al. | ............... | 43/101 |
| 1,251,926 A * | 1/1918 | Schlesinger | ............... | 256/24 |
| 1,404,552 A * | 1/1922 | Simons | ............... | 24/689 |
| 1,426,087 A * | 8/1922 | Metcalfe | ............... | 446/112 |
| 1,669,300 A * | 5/1928 | Hunter | ............... | 220/6 |
| 2,581,318 A * | 1/1952 | Bartlett | ............... | 119/514 |
| 2,821,047 A * | 1/1958 | Ruiz | ............... | 43/102 |
| 3,021,116 A * | 2/1962 | Querengesser | ............... | 256/72 |
| 3,032,919 A * | 5/1962 | Amsler | ............... | 446/112 |
| 3,169,543 A * | 2/1965 | McGerty | ............... | 135/152 |
| 3,204,606 A * | 9/1965 | Parr et al. | ............... | 119/514 |
| 3,693,592 A * | 9/1972 | Little | ............... | 119/519 |
| 3,872,620 A * | 3/1975 | Daenen | ............... | 446/112 |
| 3,921,585 A * | 11/1975 | Hall | ............... | 119/512 |
| 4,184,602 A * | 1/1980 | Moliard | ............... | 220/4.26 |
| 4,356,999 A * | 11/1982 | McShane | ............... | 256/26 |
| 4,380,327 A * | 4/1983 | Fish | ............... | 256/24 |
| 4,554,760 A * | 11/1985 | Ponzo | ............... | 43/105 |
| 4,645,183 A * | 2/1987 | Rattray et al. | ............... | 256/25 |
| 4,917,047 A * | 4/1990 | Wazeter, III | ............... | 119/474 |
| 5,010,909 A * | 4/1991 | Cleveland | ............... | 135/125 |
| 5,063,876 A * | 11/1991 | Harris | ............... | 119/513 |
| 5,282,606 A * | 2/1994 | Praiss | ............... | 256/26 |
| 5,379,786 A * | 1/1995 | Lynam | ............... | 135/87 |
| 5,533,468 A * | 7/1996 | Sampson et al. | ............... | 119/524 |
| 5,609,327 A * | 3/1997 | Amidon | ............... | 256/24 |
| 5,718,414 A * | 2/1998 | Deloach et al. | ............... | 256/24 |
| 5,727,502 A * | 3/1998 | Askins et al. | ............... | 119/499 |
| 5,967,089 A * | 10/1999 | Allen | ............... | 119/474 |
| 6,067,940 A * | 5/2000 | Holder | ............... | 119/512 |
| 6,123,321 A * | 9/2000 | Miller | ............... | 256/25 |
| 6,192,834 B1 * | 2/2001 | Kolozsvari | ............... | 119/498 |
| 6,220,265 B1 * | 4/2001 | Zheng | ............... | 135/125 |
| 6,257,559 B1 * | 7/2001 | Mouri | ............... | 256/26 |
| 6,267,079 B1 * | 7/2001 | Eby | ............... | 119/226 |
| 6,450,123 B1 * | 9/2002 | Murray et al. | ............... | 119/512 |
| 6,457,438 B1 * | 10/2002 | Baker | ............... | 119/498 |
| 6,532,701 B2 * | 3/2003 | Williams | ............... | 52/71 |
| 6,553,940 B1 * | 4/2003 | Powell et al. | ............... | 119/514 |

(Continued)

*Primary Examiner*—Teri Pham Luu
*Assistant Examiner*—Joseph W Sanderson
(74) *Attorney, Agent, or Firm*—Laurence T Pearson

(57) ABSTRACT

This invention comprises a series of lightweight, easily transportable identical frame pieces attached together to form an expandable pet enclosure that can be assembled into a multiplicity of configurations, optionally with a floor or a roof that comprises the same frame pieces.

3 Claims, 7 Drawing Sheets

U.S. PATENT DOCUMENTS

| | | |
|---|---|---|
| 6,676,113 B2 * | 1/2004 | Christensen et al. .......... 256/25 |
| 6,681,720 B1 * | 1/2004 | Skurdalsvold et al. ...... 119/474 |
| 6,688,256 B1 * | 2/2004 | King .......................... 119/474 |
| 6,763,784 B1 * | 7/2004 | Liu ............................ 119/452 |
| 6,832,580 B2 * | 12/2004 | Marchioro .................. 119/452 |
| 6,863,030 B2 * | 3/2005 | Axelrod ...................... 119/498 |
| 6,866,251 B2 * | 3/2005 | Rosaen ........................ 256/25 |
| 7,001,288 B2 * | 2/2006 | Harrell ....................... 473/446 |
| 7,055,806 B2 * | 6/2006 | York, Jr. et al. .............. 256/28 |
| 7,111,584 B2 * | 9/2006 | Wang ......................... 119/502 |
| D537,249 S * | 2/2007 | Shapiro et al. .............. D3/305 |
| 2004/0206947 A1 * | 10/2004 | Rosaen ........................ 256/25 |
| 2005/0109998 A1 * | 5/2005 | Sadinsky ..................... 256/25 |

\* cited by examiner

LIGHTWEIGHT, PORTABLE AND EXPANDABLE SMALL ANIMAL ENCLOSURE

BACKGROUND

Pet owners may wish to place their pets inside a temporary housing to separate a pet from its normal environment, or build a permanent outdoor housing from pieces that are easy to assemble.

Various cage designs have been created, many of which are bulky and consume a large area of space while being stored. In order to overcome this problem, collapsible cages have been devised to allow pet owners to easily transport and store the cage in a compact fashion. However, many of these collapsible wire cage designs are burdensome to use as they are heavy and difficult to erect for use or to fold after use.

For example, U.S. Pat. No. 6,681,720 to Doskocil describes a collapsible cage for housing an animal, the collapsible cage having an expanded position and a folded position.

U.S. Pat. No. 6,688,256 discloses a portable animal enclosure that comprises a plurality of frame pieces. Each frame piece comprises two prongs for inserting into a ground surface to keep the frame pieces stable, a cross bar disposed between said two prongs, and a hoop portion disposed above said two prongs attached to said cross bar.

U.S. Pat. No. 6,450,123 describes an apparatus that comprises a plurality of transportable panels detachably coupled to form a rectilinear corral when assembled suitable for confining a pet. Each of the plurality of panels has a slot and two panels are detachably coupled by mated slots, and wherein one of the plurality of panels has a first side portion and an opposing second side portion, the first side portion having a first slot formed therein and the second side having a second slot formed therein.

The disadvantages with the existing art in pet enclosures are that the construction may be complex, as described in the '256 patent, or the enclosure does not break down to component parts, as in the '720 patent. Or the structural options available may be limited as in the '123 patent.

A need exists for an improved, easily assembled cage that addresses these deficiencies.

SUMMARY OF THE INVENTION

This invention comprises a series of lightweight, easily transportable identical frame pieces attached together to form an expandable pet enclosure that can be assembled into a multiplicity of configurations, optionally with a floor or a roof that comprises the same frame pieces.

In one embodiment, the present invention is a portable animal enclosure for small animals comprising a multiplicity of essentially identical frame pieces and optionally one or more stabilizer poles. Any given frame piece is joined to least one neighboring frame piece by a multiplicity of ligaments. The ligaments are each permanently attached to one frame piece and each ligament comprises at least one post and one hole, said post having a protuberance, and the hole can receive the protuberance in order to allow the ligament to fold over on itself and secure the frame piece to which the ligament is attached to a second frame piece. The ligaments secure neighboring frame pieces together by wrapping around a side of the frame to which the ligament is not permanently attached in such a way that the protuberance locks the post into the hole.

In a further embodiment of the invention, the frame pieces and ligaments that the enclosure comprises may in turn comprise a thermoplastic material.

In a still further embodiment of the invention, the enclosure further comprises a roof, said roof comprising a multiplicity of said frame pieces.

In a still further embodiment of the invention, the enclosure comprises a stabilizer pole which is inserted into a loop made by the ligaments that secure two frame pieces. The stabilizer pole comprises a hook, and the hook engages one ligament to provide lateral stability to the assembled enclosure when the pole is inserted into the ground under the enclosure.

BRIEF DESCRIPTION OF THE DRAWINGS

These objects, features and advantages of the invention will become apparent from the following description in connection with the accompanying drawings. The drawings are intended for illustration only and not as a definition of the limits of the invention.

DETAILED DESCRIPTION OF THE INVENTION

This invention comprises a series of lightweight, easily transportable, essentially identical, framed fencing pieces attached together to form an expandable pet enclosure.

By "essentially" in the context used above means that the pieces are manufactured to the same dimensions and with the same configuration of ligaments attached thereto, and that one or more of the frame pieces may comprise a door, as described below.

In one embodiment, the present invention is a portable animal enclosure for small animals comprising a multiplicity of identical frame pieces and optionally one or more stabilizer poles. Any given frame piece is joined to least one neighboring frame piece by a multiplicity of ligaments. The ligaments are each permanently attached to one frame piece and each ligament comprises at least one post, said post having a protuberance, and a hole to receive the protuberance. The ligaments secure neighboring frame pieces together by wrapping around a side of the frame to which the ligament is not permanently attached in such a way that the protuberance locks the post into the hole.

In a further embodiment of the invention the ligaments are detachable from the neighboring frame piece by means of the post being removable from the hole, for example by a pulling or twisting action that removes the protuberance through the hole.

The fact that the frame pieces are identical means that the enclosure can be manufactured inexpensively, preferably from a light thermoplastic material. The material of construction of the frame pieces shall be such as to provide sufficient rigidity to the assembly that it is free standing when assembled, with the stabilizer pole in place if necessary. In a preferred embodiment, the lightweight thermoplastic material is a flexible material such as polyethylene or a copolymer thereof which has a density of less than 1.0 grams per cubic centimeter and more preferably less than 0.9 grams per cubic centimeter.

Figure 1:
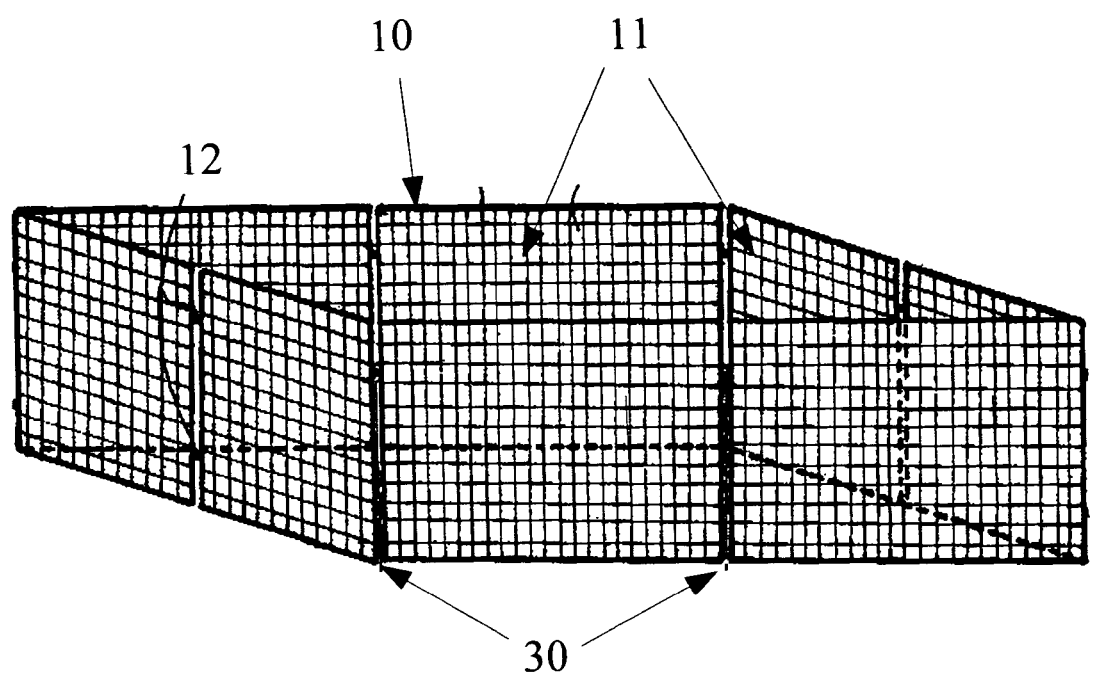
FIG. 1 illustrates a perspective view of an assembled pet enclosure utilizing eight framed fencing pieces.

Referring in detail to the drawings, FIG. 1 illustrates a schematic diagram of a perspective view of an assembled pet enclosure (10) utilizing eight assembled essentially identical framed fencing pieces (11) and the use of an optional stabilizer pole 30, which is sleeved through looped ligament (12) and inserted into the ground surface at the base of the enclosure. In the enclosure of FIG. 1 the stabilizer pole is inserted into a loop made by the ligaments that secure two frame pieces, and the stabilizer pole comprises a hook, and the hook engages one ligament to provide lateral stability to the assembled enclosure.

Figure 2:
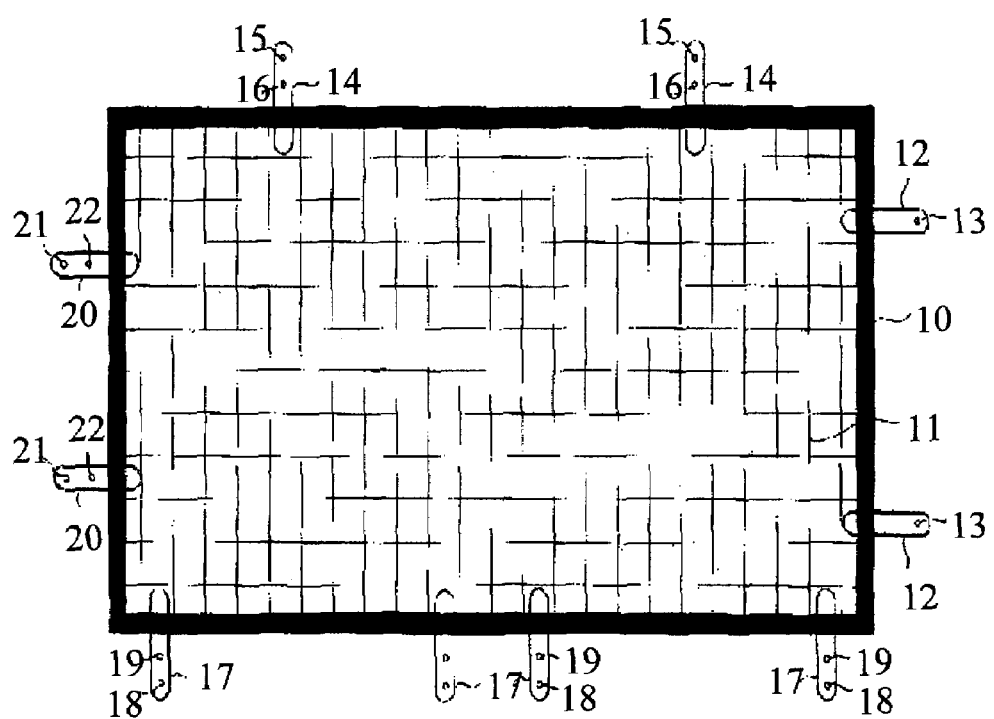
FIG. 2 illustrates a planar side view of the exterior side of a single framed fencing piece.

FIG. 2 shows frame pieces 11. Ligament 12, 14, 17 and 20 are permanently attached to the frame 10 and comprise apertures 13, 15, 16, 18, 19, 21 and 22. Attachment may be by means of glue, by welding, by the molding in situ during the manufacturing process of the ligaments onto the frame piece or by any means known to one skilled in the art.

Figure 3:
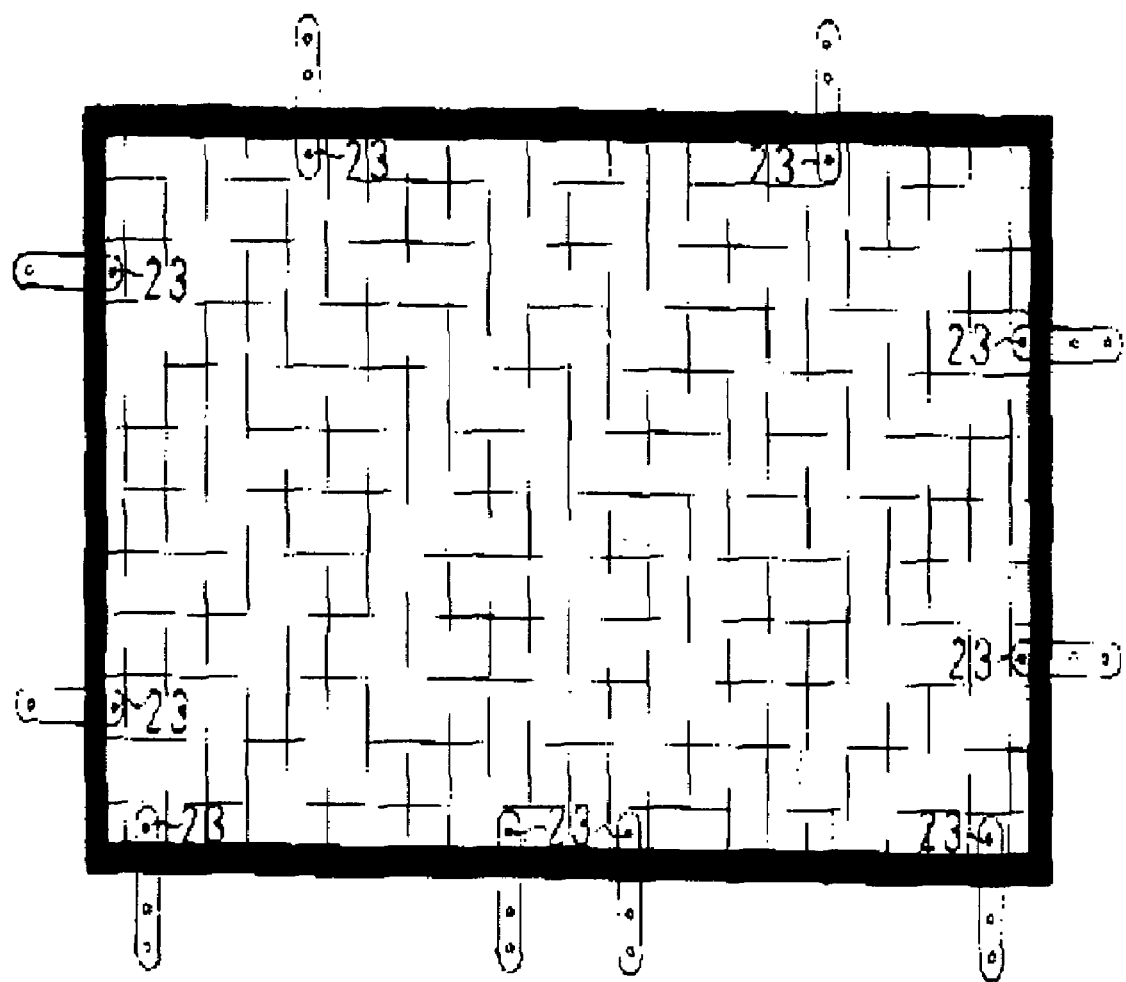
FIG. 3 illustrates a planar side view of the interior side of a single framed fencing piece.

FIG. 3 illustrates the interior side of the enclosure whereby the ligaments 12,14, 17 and 20 are permanently attached to frame piece 11 and are looped around the frame of an adjacent framed fencing piece and the apertures 13, 15, 16,18, 19, 21 and 22 are snapped into place onto post 23.

Referring to FIGS. 2 and 3, apertures 16,19 and 22 on appendages 14, 17 and 20 are folded over and snapped into place onto post 23 when the addition of a cover and flooring is not necessary.

Referring to FIGS. 2 and 3, aperture 15 on appendage 14 is looped over the frame 10 at each location and snapped into place onto post 23 when the addition of a cover is desired.

Referring to FIGS. 2 and 3, apertures 18 and 21 on appendages 17 and 20 are looped over the frame 10 at each location and snapped into place onto post 23 when the addition of flooring is desired.

Figure 4:
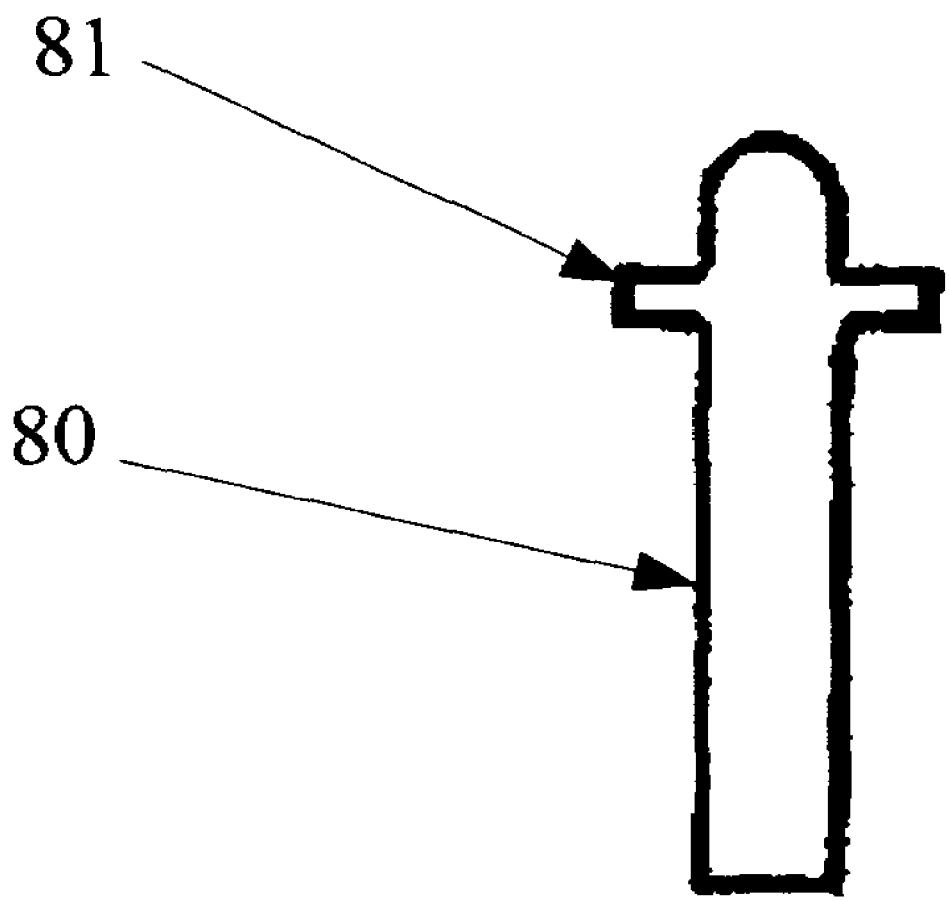
FIG. 4 illustrates a planar side view of the post to which the aperture on the appendage engages.

FIG. 4 shows an example of the post (80), comprising a protuberance (81). The protuberance may consist of small posts protruding from the side of the main post (80), or may be a disc that encircles the post (80). It may be any means known to one skilled in the art of attaching the post into a hole in a ligament with the assurance that it will stay there after assembly of the enclosure.

Figure 5:
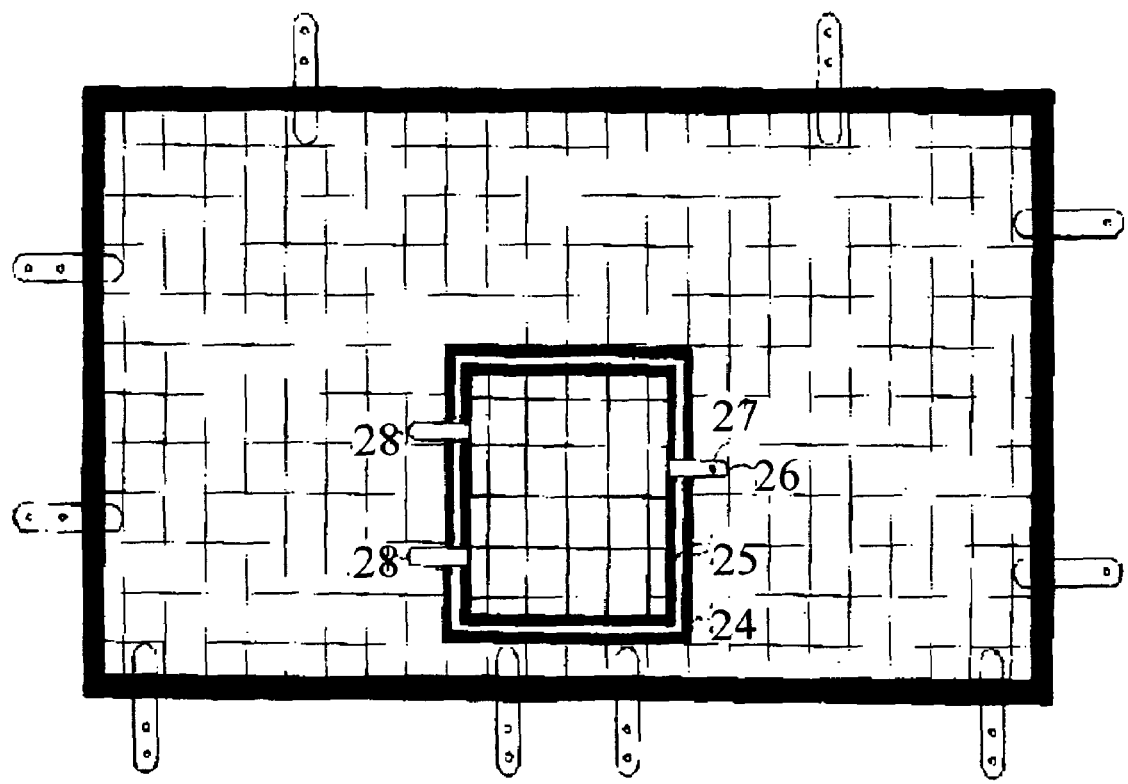
FIG. 5 illustrates a planar side view of the exterior side of a single framed fencing piece encompassing an optional door.

FIG. 5 shows the embodiment of FIG. 2 containing the option of a permanently affixed door within the fencing material 11. Frame 24, as well as frame 25, is necessary to stabilize the fencing material at both locations. Ligaments 28 are permanently affixed to frame 25, looped around frame 24 and permanently affixed to frame 25 to provide the swinging door. Ligament 26 is permanently affixed to frame 25, looped around frame 24 and snapped into place by positioning aperture 27 through post 29, which is permanently affixed to the interior side of frame 25.

Figure 6:
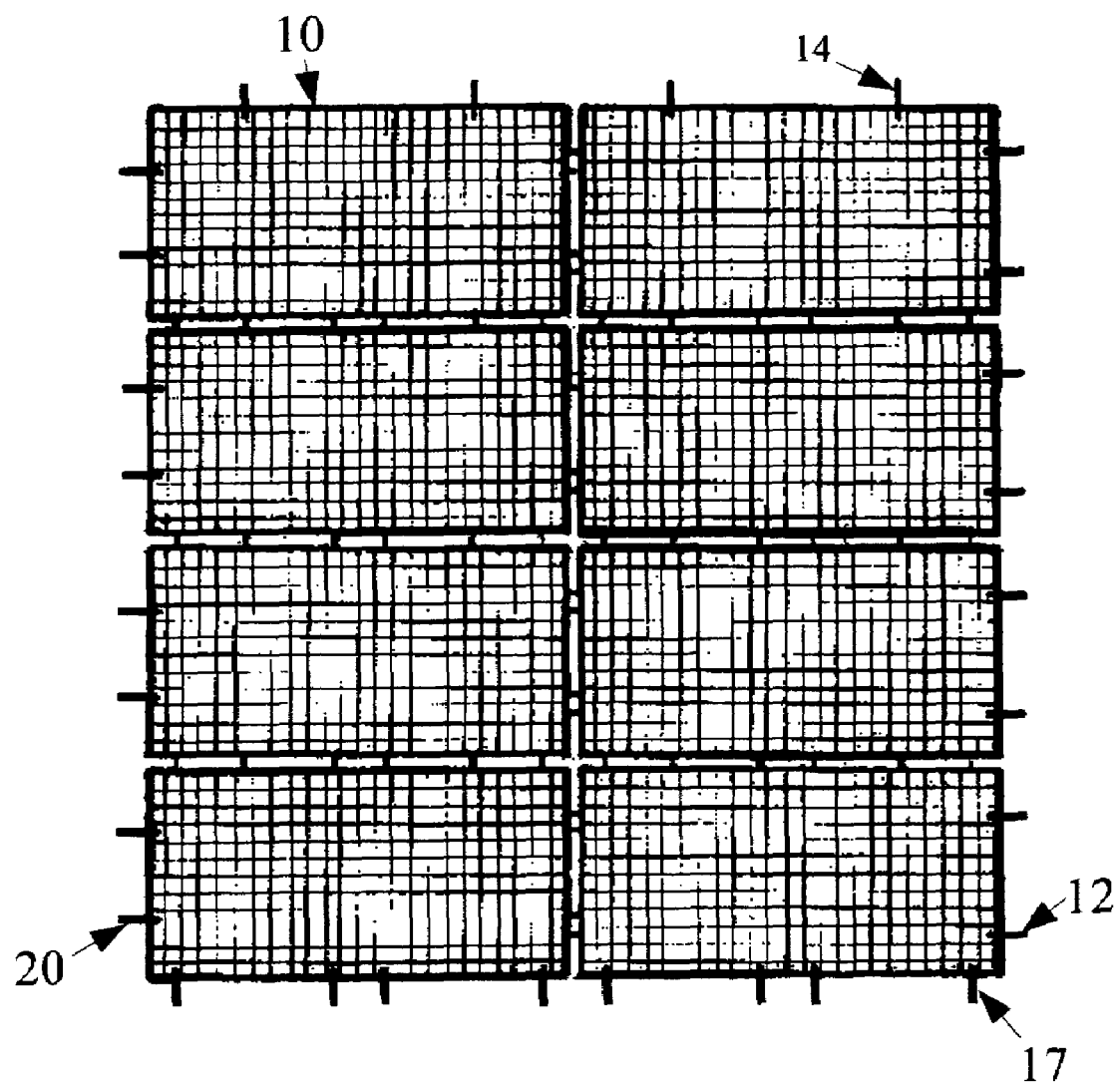
FIG. 6 illustrates a top view of an assembled cover or flooring for an eight-piece enclosure.

FIG. 6 shows the embodiment of FIGS. 1 and 2 whereby eight framed fencing pieces are assembled to add a cover or flooring (10) to the enclosure described in FIG. 1. In FIG. 6, ligaments 14 and 17 are utilized in assembly of the framed fencing pieces. It would be at the user's discretion to decide upon the number of connections necessary to provide the stability needed for the cover and/or flooring. Any of the ligaments may be used to secure the cover and/or flooring to the vertical walls of the enclosure.

Figure 7:
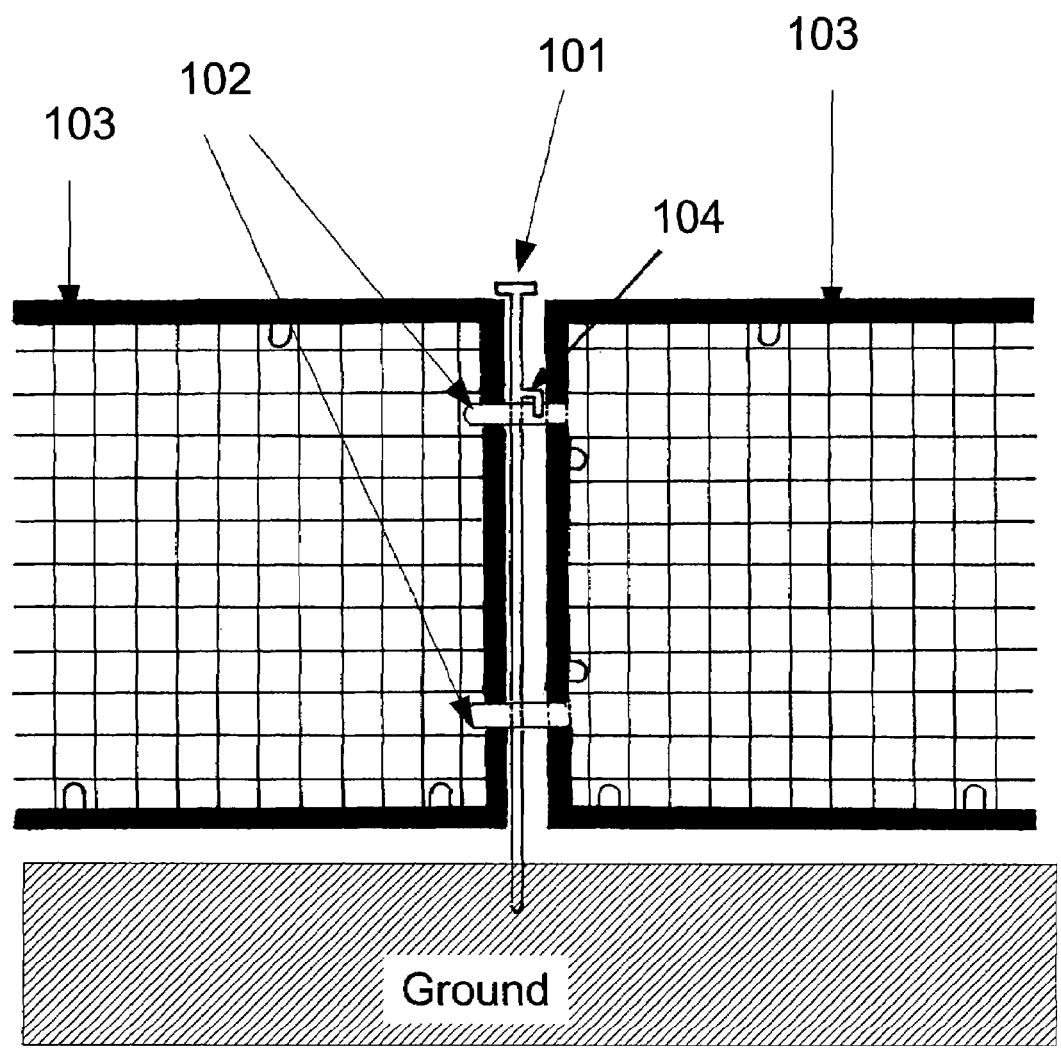
FIG. 7 illustrates how a stabilizer pole is located relative to two frame pieces and the ligament joining said frame pieces.

FIG. 7 shows a still further embodiment of the invention. The enclosure comprises a stabilizer pole (101) which is inserted into a loop made by the ligaments (102) that secure two frame pieces (103). The stabilizer pole comprises a hook (104), and the hook engages one ligament (102) to provide lateral stability to the assembled enclosure when the pole is inserted into the ground under the enclosure.

The invention has been described and claimed herein with reference to particular examples in the figures, but the scope of the claims is not by any means intended to be limited thereby. One skilled in the art will be able to devise variations on the invention described herein and the scope of the claims is intended to include any and all of such variations.

I claim:

1. A portable animal enclosure for small animals comprising a multiplicity of essentially identical frame pieces in which in said enclosure any given frame piece is joined to at least one neighboring frame piece by a multiplicity of ligaments, said ligaments each being permanently attached to one frame piece and each ligament comprising at least one post, said post having a protuberance, and a hole to receive the protuberance, and in which the ligaments wrap around a side of the frame to which the ligament is not permanently attached in such a way that the protuberance locks the post into the hole, the enclosure further comprising a roof, said roof comprising a multiplicity of said frame pieces.

2. The portable animal enclosure of claim 1 which further comprises one or more stabilizer poles, in which the stabilizer pole is inserted into one or more loops made by the ligaments that secure two frame pieces, and the stabilizer pole comprises a hook, which hooks on one ligament to provide lateral stability to the assembled enclosure.

3. A portable animal enclosure for small animals comprising a multiplicity of essentially identical frame pieces and one or more stabilizer poles, in which in said enclosure any given frame piece is joined to at least one neighboring frame piece by a multiplicity of ligaments, said ligaments each being permanently attached to one frame piece and each ligament comprising at least one post, said post having a protuberance, and a hole to receive the protuberance, and in which the ligaments wrap around a side of the frame to which the ligament is not permanently attached in such a way that the protuberance locks the post into the hole, and in which the stabilizer pole is inserted into one or more loops made by the ligaments that secure two frame pieces, and the stabilizer pole comprises a hook, which hooks on one ligament to provide lateral stability to the assembled enclosure.

* * * * *